(12) United States Patent
Angelis et al.

(10) Patent No.: US 7,986,246 B2
(45) Date of Patent: Jul. 26, 2011

(54) INTEGRATED DATA COLLECTION, ANOMALY DETECTION AND INVESTIGATION, SUCH AS INTEGRATED MOBILE UTILITY METER READING, THEFT DETECTION AND INVESTIGATION SYSTEM

(75) Inventors: Bruce Angelis, Spokane, WA (US); Eric Miller, Oakland, CA (US)

(73) Assignee: Itron, Inc., Liberty Lake, WA (US)

( * ) Notice: Subject to any disclaimer, the term of this patent is extended or adjusted under 35 U.S.C. 154(b) by 1153 days.

(21) Appl. No.: 11/692,991

(22) Filed: Mar. 29, 2007

(65) Prior Publication Data

US 2007/0247331 A1  Oct. 25, 2007

Related U.S. Application Data

(60) Provisional application No. 60/788,134, filed on Mar. 31, 2006.

(51) Int. Cl.
 *G08C 15/06* (2006.01)
(52) U.S. Cl. ............ 340/870.02; 340/870.11; 705/9
(58) Field of Classification Search ......... 340/870.02, 340/870.11; 705/9
See application file for complete search history.

(56) References Cited

U.S. PATENT DOCUMENTS

| | | | |
|---|---|---|---|
| 4,301,444 A | 11/1981 | Bruckert et al. | |
| 4,654,662 A * | 3/1987 | Van Orsdel | 340/870.03 |
| 4,757,456 A * | 7/1988 | Benghiat | 705/412 |
| 5,086,292 A | 2/1992 | Johnson et al. | |
| 5,155,481 A * | 10/1992 | Brennan, Jr. et al. | |
| 5,473,322 A | 12/1995 | Carney | |
| 5,617,084 A | 4/1997 | Sears | |
| 6,181,257 B1 | 1/2001 | Meek et al. | |
| 6,232,886 B1 | 5/2001 | Morand | |
| 6,801,865 B2 | 10/2004 | Gilgenbach et al. | |
| 7,054,770 B2 | 5/2006 | Swarztrauber et al. | |
| 7,106,044 B1 | 9/2006 | Lee, Jr. et al. | |
| 7,400,264 B2 | 7/2008 | Boaz | |
| 7,402,993 B2 | 7/2008 | Morrison | |
| 2004/0021568 A1 | 2/2004 | Seal et al. | |
| 2005/0119930 A1* | 6/2005 | Simon | 705/9 |
| 2005/0190066 A1 | 9/2005 | Schleich et al. | |
| 2007/0247331 A1* | 10/2007 | Angelis et al. | 340/870.02 |
| 2007/0247789 A1* | 10/2007 | Benson et al. | 361/672 |
| 2008/0026780 A1* | 1/2008 | Hart et al. | 455/466 |

FOREIGN PATENT DOCUMENTS

| CA | 2 661 730 | 9/2001 |
|---|---|---|
| CA | 2 485 593 | 1/2006 |

\* cited by examiner

*Primary Examiner* — Timothy Edwards, Jr.
(74) *Attorney, Agent, or Firm* — Dority & Manning, P.A.

(57) ABSTRACT

An automated method and system for use during manual data collection, such as utility data collection, compares collected data with additional data to determine if the collected data deviates from an expected value, which may indicate a tamper, theft, leak, malfunction, etc. The method may provide one or more notifications or in-field investigation instructions in response thereto.

22 Claims, 6 Drawing Sheets

INTEGRATED DATA COLLECTION, ANOMALY DETECTION AND INVESTIGATION, SUCH AS INTEGRATED MOBILE UTILITY METER READING, THEFT DETECTION AND INVESTIGATION SYSTEM

CROSS-REFERENCE TO RELATED APPLICATION(S)

This application claims the benefit of U.S. Provisional Patent Application No. 60/788,134 filed Mar. 31, 2006, entitled INTEGRATED DATA COLLECTION, ANOMALY DETECTION AND INVESTIGATION, SUCH AS INTEGRATED MOBILE UTILITY METER READING, THEFT DETECTION AND INVESTIGATION SYSTEM, which is incorporated by reference in its entirety.

This application is related to commonly assigned U.S. Provisional Application No. 60/788,035 filed Mar. 31, 2006, entitled DATA ANALYSIS SYSTEM, SUCH AS A THEFT SCENARIO ANALYSIS SYSTEM FOR AUTOMATED UTILITY METERING and U.S. patent application Ser. No. 11/692,996, filed concurrently herewith, entitled DATA ANALYSIS SYSTEM, SUCH AS A THEFT SCENARIO ANALYSIS SYSTEM FOR AUTOMATED UTILITY METERING, both of which are incorporated by reference in their entireties.

BACKGROUND

Loss or theft of utilities is a problem that many utility industries must face. For example, unscrupulous individuals will tamper with an electric meter by removing the meter and reinstalling it upside down (so that it decrements, rather than increments with utility usage), bypass the meter entirely, tamper with the meter to prevent it from incrementing (e.g. after opening a seal on the meter), cutting cables, and so forth.

If a theft or tamper is detected or suspected, the utility will send out a trained investigator to analyze the situation and, at times, pursue an appropriate course of action with an alleged thief/tamperer. However, utilities typically only have a few of these trained individuals, and often have no additional procedures to readily identify suspected thefts or meter tamperings and deal with such problems.

Other losses or anomalies in meter readings should also be detected. For example, leaks may be developed in water lines, causing an anomalous increase in water meter readings. Alternatively, no leak may exist, but through accounting errors, meter reading faults, or other problems, a customer may be sent a bill having an inappropriately high amount with respect to the customer's actual utility consumption amount.

These and other problems exist with respect to detecting and correcting anomalous data gathered during data collection.

DETAILED DESCRIPTION

Described in detail below is a system to analyze, in the field, anomalous data, such as usage and tamper data from mobile utility data collection. In one implementation, the system may determine if nearby automatic meter reading (AMR) service points qualify for theft investigation by a theft investigator, qualify for fault detection/correction, or qualify for investigation by other trained field personnel. The system may also provide instructions to facilitate field investigation by mobile data collectors or field workers (e.g., meter reading personnel) to, for example, collect investigation data. Since these personnel are physically in the field and in close proximity to suspect service points, tamper data collection, theft analysis, investigation and resolution may be performed efficiently, which reduces theft-to-investigation time delays. An in-field data collection device (handheld, in-vehicle, etc.) processes real-time readings and tamper data against downloaded historical and forecasted information to produce in-field investigation work orders while the field worker is still in close proximity to suspect locations.

The in-field device includes software that alerts field workers of suspect service points or meters, while providing customer account information, meter information, usage and usage history, forecast information, as well as interpreted tamper status and history. Thus, in addition to creating an automatic software-based investigation work order for the field worker, the device may provide the field worker with appropriate information to permit the worker to confirm or double-check the reasonableness of the investigation work order, and to determine whether investigation by other personnel is required. The in-field device may also bundle or aggregate several investigations into efficient workflows or route numbers, which can be later processed at convenient times and locations by the field worker (or for a later investigator). The in-field device may provide notifications that include a street level map representation of where to locate suspect service ports, including location of service points on a premises and warning indicators (e.g., "warnings" of a "dangerous dog").

As the field worker processes the investigation work order, the in-field device may request information about the service port, including its physical condition, orientation, connection status, status of seal and glass, etc. This information can be processed locally on the device to provide further instructions to the field worker, such as requesting digital photos of the site. This investigation information can be uploaded from the field, to a central office, as a processed work-order for further action. Thus, while prior analysis may have been done at a central office or at the head-end, suspect service points may be flagged in the field and investigated via the portable in-field device. Thus, the in-field device reduces theft-to-investigation cycles by efficiently detecting and investigating utility theft using existing meter reading equipment and the in-field work force. The device may eliminate the need for certain special trips for theft investigators on AMR equipment premises, since the device provides near real-time investigations. Theft investigations can be conducted out of standard billing cycles and thus suspect locations or areas can be patrolled off-cycle to catch thieves aware of billing cycles. While generally described below with respect to investigating potential theft, embodiments of the invention are equally applicable to process potential leaks, or other conditions that may produce anomalous data.

Various embodiments of the invention will now be described. The following description provides specific details for a thorough understanding and enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

II. Representative System

Figure 1:
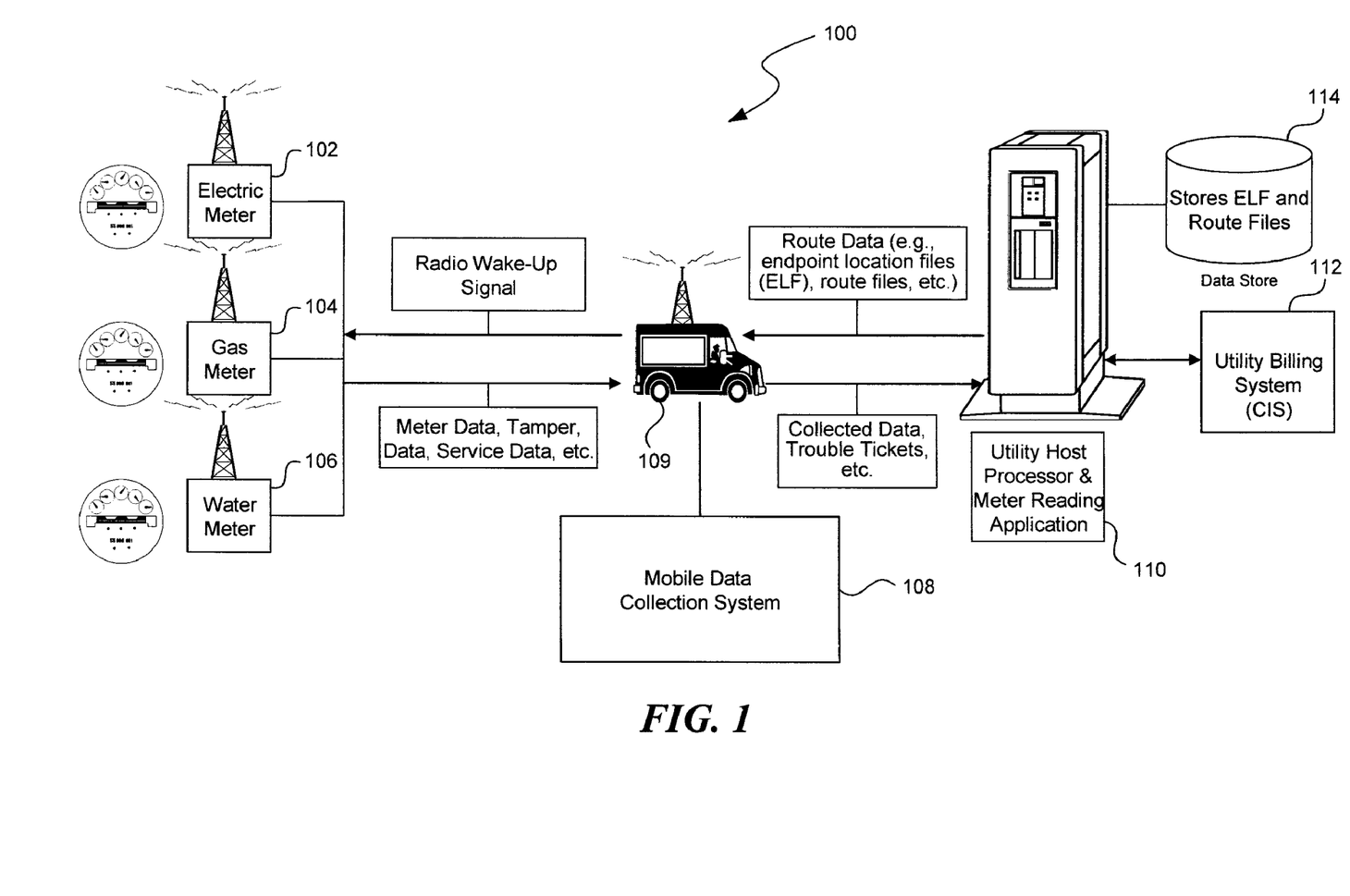
FIG. 1 is a block diagram of a mobile utility data collection system that employs aspects of the invention.

FIG. 1 and the following discussion provide a brief, general description of a suitable environment in which the invention can be implemented. Although not required, aspects of the invention are described in the general context of computer-executable instructions, such as routines executed by a general-purpose computer (e.g., wireless device, or personal/laptop computer). Those skilled in the relevant art will appreciate that the invention can be practiced with other communications, data processing, or computer system configurations, including Internet appliances, handheld devices (including personal digital assistants (PDAs)), wearable computers, all manner of cellular or mobile phones, embedded computers (including those coupled to vehicles), multi-processor systems, microprocessor-based or programmable consumer electronics, set-top boxes, network PCs, mini-computers, mainframe computers, and the like. Indeed, the terms "computer" and the like are generally used interchangeably and refer to any of the above devices and systems, as well as any data processor.

Aspects of the invention can be embodied in a special purpose computer or data processor that is specifically programmed, configured, or constructed to perform one or more of the computer-executable instructions explained in detail herein. Aspects of the invention can also be practiced in distributed computing environments where tasks or modules are performed by remote processing devices, which are linked through a communication network. In a distributed computing environment, program modules may be located in both local and remote memory storage devices.

Aspects of the invention may be stored or distributed on computer-readable media, including magnetically or optically readable computer disks, as microcode on semiconductor memory, nanotechnology memory, organic or optical memory, or other portable data storage media. Indeed, computer-implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or may be provided on any analog or digital network (packet switched, circuit switched, or other scheme). Those skilled in the relevant art will recognize that portions of the invention reside on a server computer, while corresponding portions reside on a client computer, such as a mobile device.

Referring to FIG. 1, a mobile automatic meter reading (MAMR) system 100 is an example of one arrangement of elements, but others are possible. The system 100 includes a collection of utility meters or service points (102, 104, and 106). The utility meters may be of the same or different types (e.g., electric 102, gas 104, water 106, or other (not shown)). The utility meters (102, 104, and 106) may be distributed in a bounded unbounded geographical area. Each utility meter (102, 104, or 106) is connected to or associated with a utility consuming facility (not shown). For example, a utility meter may correspond with a household, a commercial facility, or another utility consuming facility or device. The system may also collect data from other data sources besides utility meters, as described herein.

While not illustrated in detail, each meter (102, 104, or 106) includes a storage component (not shown) for storing collected data before transmission to a data collection system. The storage component may store information identifying the meter, such as a meter identification number. In addition, each meter may be configured with a receiver/transmitter telemetry device (e.g., an encoder receiver transmitter (ERT)) capable of sending and receiving signals to and from a mobile data collection system 108. In general, these components (meter, storage, and telemetry device) may be collectively referred to as an "endpoint." However, the term "endpoint" may herein refer to any one of a number of possible configurations for locally collecting data, such as utility consumption data, and not only the sample configuration described above.

To facilitate MAMR or similar techniques, the mobile data collection system 108 may be installed in a vehicle 109 or be otherwise configured to be transported through a route (e.g., handheld). For example, the vehicle or system may include the appropriate antennas, power supply, any necessary mounts, etc. Of course, the system described herein can also be employed in a handheld device, or other in-field device.

The system 100 also includes a host processing system and/or meter reading application(s) 110 for processing collected meter reading data. The host processing system 110 may be a head-end server computer. In some embodiments, the host processing system and/or meter reading application(s) 110 use customer information to create route files used when driving the route to collect meter data. Examples of meter reading applications may include MV-RS™, Premierplus4™, Viena™, and Integrator™, all by Itron, Inc. of Spokane, Wash. The host processing system and/or meter reading application(s) 110 may operate in association with systems operated by a utility company, such as a utility billing system 112 or, more generally, a customer information system (CIS). In this way, the host processing system and/or meter reading application(s) 110 can also communicate data to the mobile data collection system 108. This information may include both route file and endpoint location file (ELF) data, which may be stored in a data store 114 prior to export from the billing system/CIS. However, in some embodiments, endpoint location files may also be transmitted directly from the billing system/CIS 112 to the mobile data collection system 108. Likewise, data collected by the mobile data collection system 108 may be returned to host processing system and/or the meter reading application(s) 110 for processing.

Figure 2:
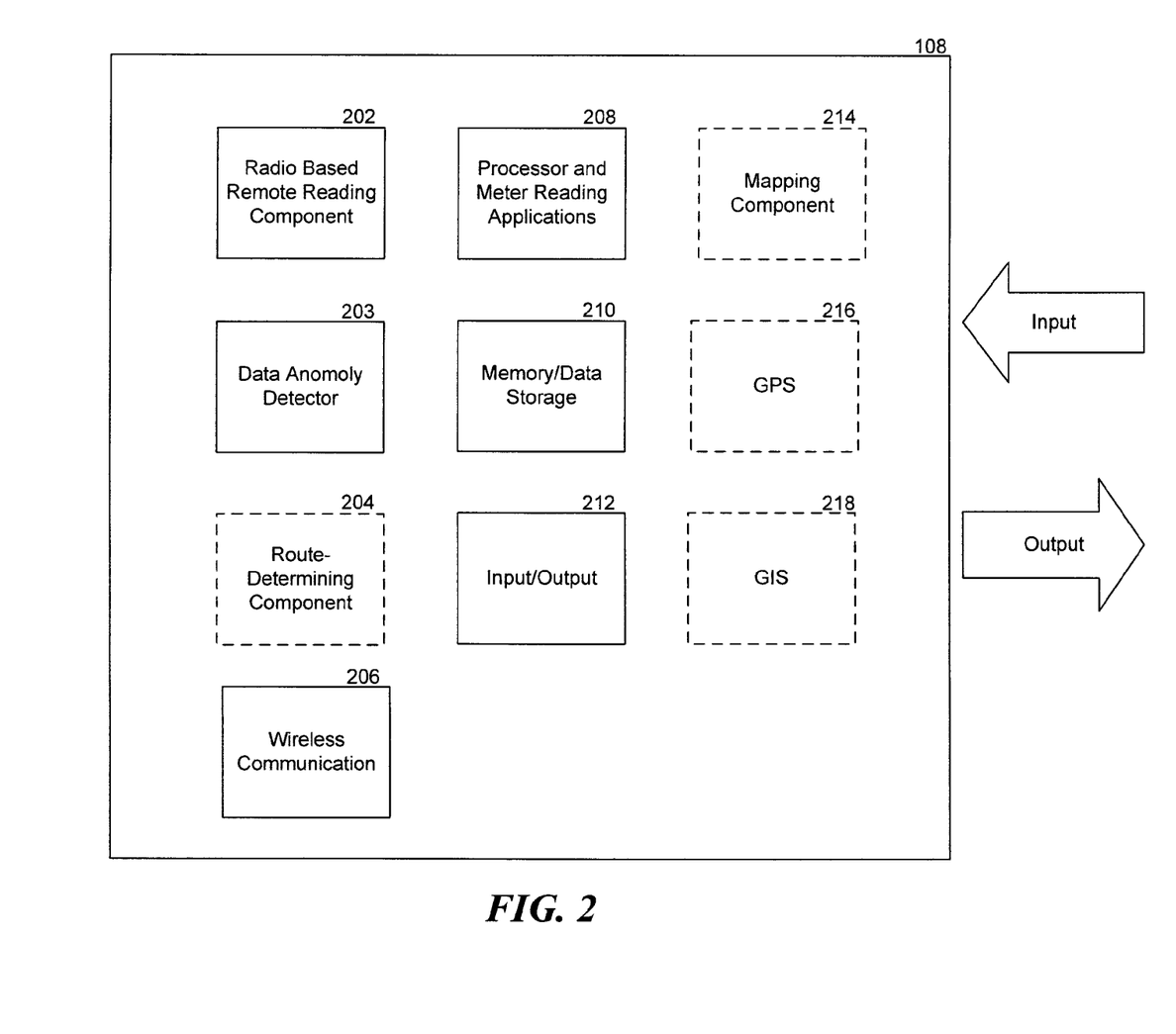
FIG. 2 is a block diagram of a meter or data collecting reading system of FIG. 1.

Referring to FIG. 2, the data collection system 108 of FIG. 1 is shown in more detail. The data collection system 108 includes a remote reading component 202 (e.g., radio based), a data anomaly detector 203 (described below), and an optional sequencing component 204. In some embodiments, these and other portions of the data collection system 108 may effectively be combined into a single system. For example, because many of the features required for collecting data from endpoints may be useful in identifying anomalous data and determining an optimal sequence for communicating with or investigating endpoints. Here, however, they are illustrated separately to demonstrate the distinct functions of the components.

The data collection system 108 also includes a wireless component 206, which, in some embodiments, may include an antenna and a transceiver (not shown). The transceiver of the wireless component 206 sends signals to wake up endpoints that function in "wake-up" mode to receive and manage incoming data. A processor with meter-reading and other applications 208 provide capabilities to control several processes, including managing collected data, and other functions described herein.

The data collection system 108 may store collected data in a memory or other storage device 210 associated with the data collection system 108, such as a non-volatile memory. For example, the memory 210 can store not only collected meter data, but also route information, performance, communications statistics, history, and other data noted herein. As described below, the memory 210 can store both internal and external data within the in-field device 108, to thereby avoid the need for the device to access a database at the host processing system 110. This information may be used as input to 204 to help identify anomalous data from endpoints.

A user input/output component 212 provides an appropriate user interface for an operator of the data collection system 108. For example, the data collection system 108 may provide a color touchscreen display for ease of use, and for clear graphical displays. Other user input/output options are possible, including mouses, microphones, speakers, joysticks, keyboards, LCD screens, audio, etc. One application of the input/output component 212 includes displaying and controlling mapping images generated by an optional mapping component 214. In this way, the field worker is provided with feedback, so that he or she can determine which meter readings have been completed on a particular route and so he or she can view endpoints on the route in relation to the vehicle and to other endpoints. The input/output component 212 and mapping component 214 can graphically display suspect endpoints for in-field investigation by the field worker, as described below. Optional Global Positioning System (GPS) 216 or Geographical Information System (GIS) 218 components may also be included. Further details regarding mapping and location determining components may be found in commonly assigned U.S. patent application Ser. No. 11/064,433, entitled Utility Endpoint Communication Scheme, Such As For Sequencing The Order Of Meter Reading Communications For Electric, Gas And Water Utility Meters, filed Feb. 22, 2005, and application Ser. No. 10/903,866, filed Jul. 30, 2004, entitled Mapping In Mobile Data Collection Systems, Such As Utility Meter Reading And Related Applications.

Figure 3:
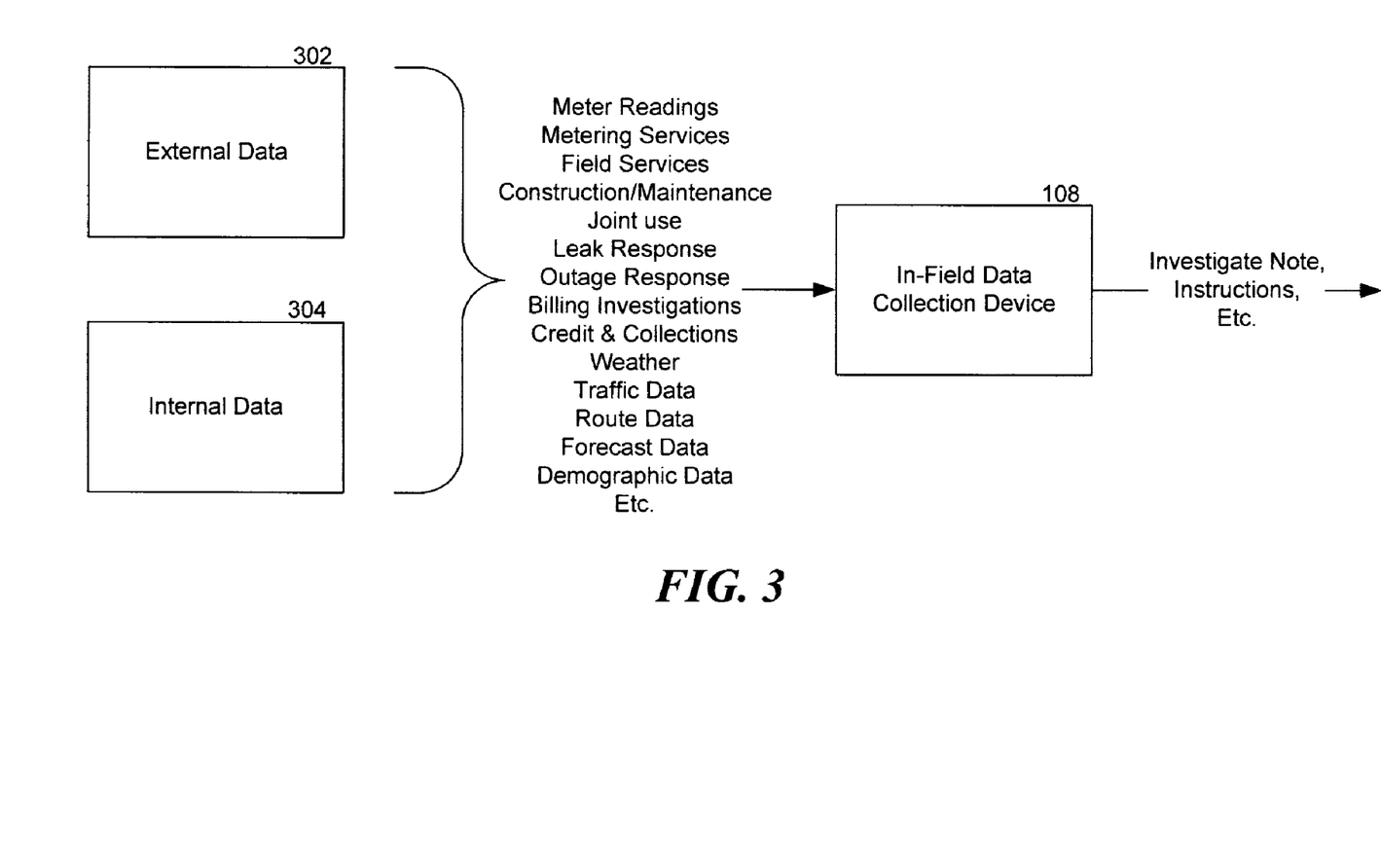
FIG. 3 is a data flow diagram illustrating suitable data flows that occur in performing suspected theft/tamper detection, and providing instructions to a field worker or meter reader.

Referring to FIG. 3, the in-field data collection device 108 receives external data 302 and internal data 304, with which it applies one or more rules or conditions to generate output to the field worker. External data may represent data external to the system 100, such as weather data, traffic data, demographic data, road construction/maintenance data, news data, etc. Internal data represents data gathered or generated by the system 100, such as meter readings, metering services, field services, utility construction/maintenance data, joint use data, leak or outage response data, billing investigation data, credit and collections data, route data, forecast data. The in-field data collection device 108 employs some or all of the internal and external data, together with locally stored rules (described below) to generate an investigation note to instruct the field worker to investigate a potential tamper, leak, or other error. This investigation note may provide instructions, as described below, and the data collection device may also generate additional data for the system, such as a work ticket, ticket for investigation by a theft investigator, and so forth. Further details on work tickets may be found in U.S. application Ser. No. 10/971,720, entitled Combined Scheduling and Management of Work Orders, Such as for Utility Meter Reading and Utility Servicing Events, filed Oct. 21, 2004.

Figure 4:
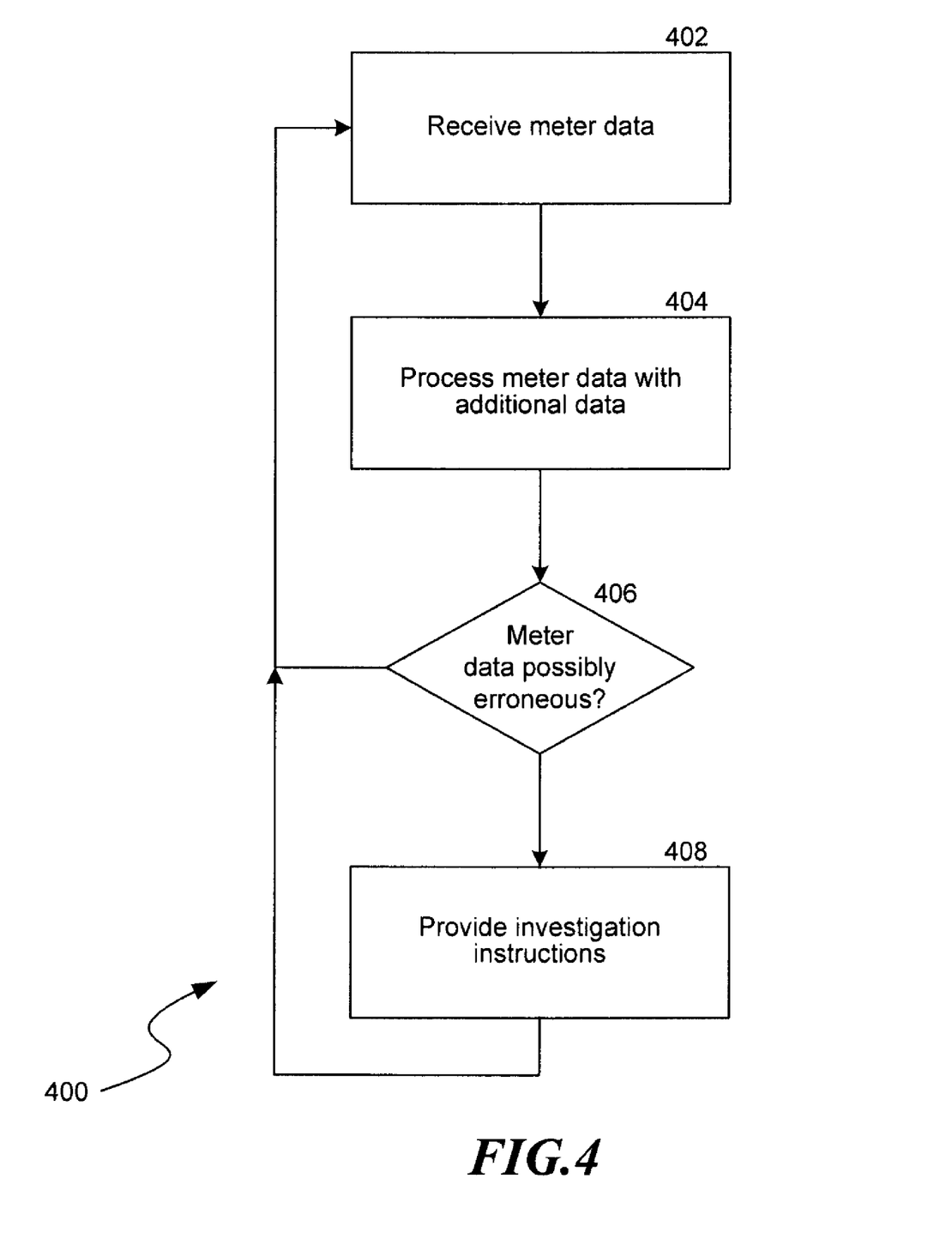
FIG. 4 is a flow diagram illustrating a process for automatically identifying potentially erroneous meter data.

Referring to FIG. 4, an example of the data anomaly detector 203 is shown as a routine 400 for processing input data and providing output instructions in light of possibly erroneous collected data. Beginning in block 402, the routine 400 receives input data, such as meter data, via the radio-based remote reading component 202, wireless communication component 206, or similar data receiver. Under block 404, the processor 208 of the mobile data collection system 108, processes the meter data with additional data, such as the data described with respect to FIG. 3, or described herein. Further details regarding processing of data is provided below.

In block 406, the processor 208 determines whether the meter data indicates a possibly erroneous reading, such as a leak, theft, damaged meter, and so forth. Under block 408, the mobile data collection system 108 at least in part provides investigation instructions to the field worker. These instructions, described in greater detail below, may be stored locally on the mobile data collection device 108, or may be received from a remote location, such as from the utility host processor 110. Based on the received instructions, the field worker can investigate the meter or endpoint based on the provided instructions.

Some examples of uses of data and rules by the in-field device 108 will now be provided. For example, the in-field device 108 may employ rules with various external data 102, such as weather and season data, which greatly affect the usage of power and other utilities (e.g., more use of water during the summer). Profile data based on zipcodes can indicate greater uses of utilities. For example, upscale zipcodes associated with large homes typically use more utilities, such as electricity to heat/cool larger homes. The utility provider can determine the size of an electrical service provided to a house and other data associated with that location. This data is used with historical data to determine whether someone may have tampered with the meter. Historical data could show that a person typically uses power at a given rate for a given time of year. If usage is below that historical amount by a certain standard deviation, then the system generates an in-field investigation flag or work order.

Figure 6:
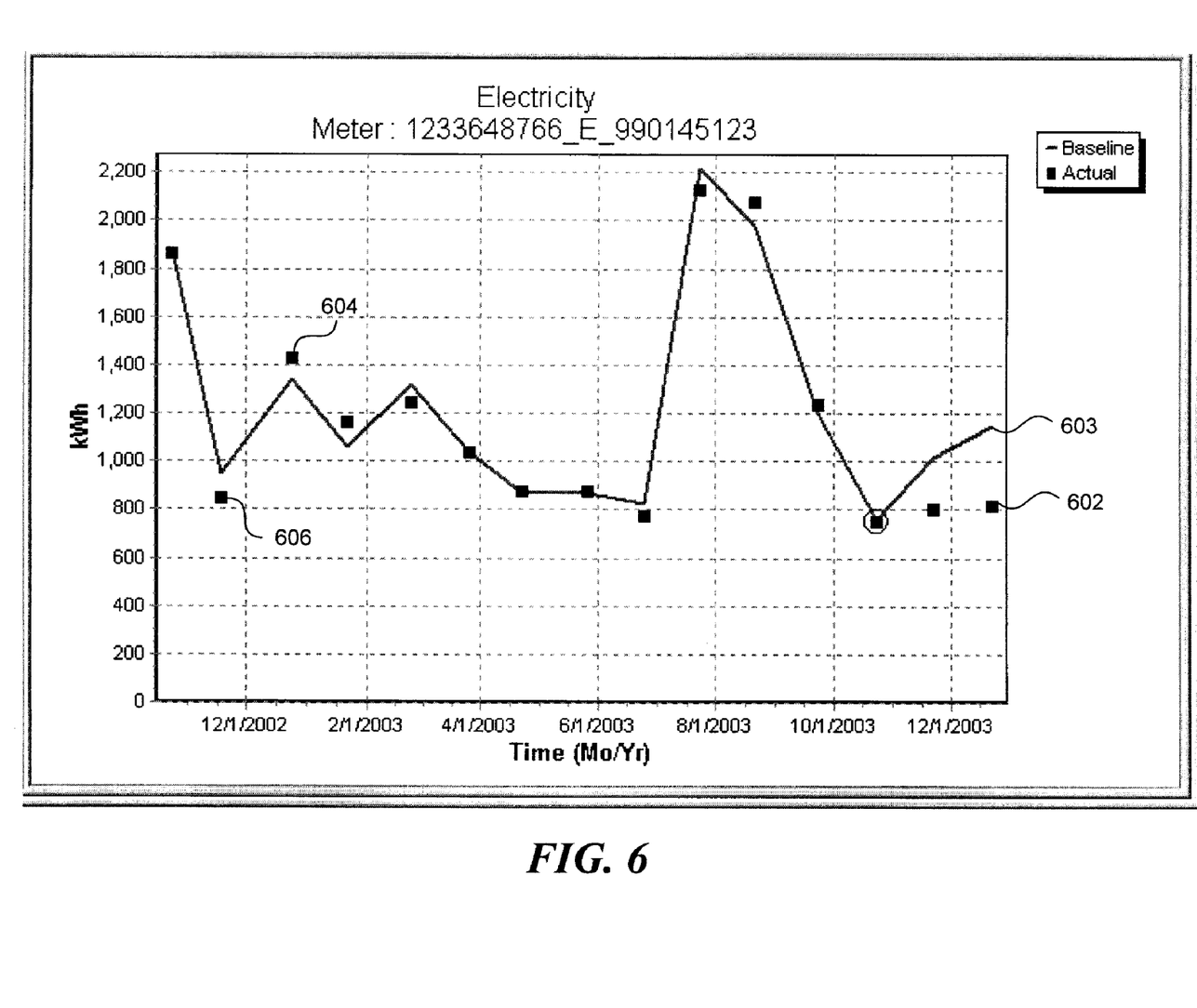
FIG. 6 is a display screen illustrating a series of actual meter readings with an overlay of baseline or expected meter readings to detect erroneous data.

FIG. 6 shows an example of a graph of historical usage data (represented by the dots). A line in FIG. 6, representing a baseline of expected consumption is shown. By providing both the actual and baseline data at the in-field device, the device or field worker can determine whether a current utility reading is significantly different from an expected or baseline reading. For example, a current reading 602 is below an expected value 603. Such a deviation may cause the in-field device 108 to automatically generate an investigate flag or notice to the field worker. Likewise, readings 604 and 606 are above and below expected readings, respectively, and could represent other errors (e.g., billing errors, reading errors, metering errors, etc.).

As another example, the in-field device 108 can generate an investigate flag for the field worker when it receives a signal from an encoder receiver transmitter (ERT) indicating that the meter has possibly been tampered with. Many meters and ERTs include sensors, switches or other means to create a signal indicating a potential tamper. That signal is then provided to the in-field device for analysis to potentially generate an investigative flag.

The utility provider decides on a threshold or rules for when to request the field worker to investigate a meter to determine whether a tamper or other event may have occurred. The rules may be different depending upon various conditions. If the field worker is walking by, then it is easy for him or her to investigate the meter. However, if the field worker is in a van, then the system may establish a higher threshold (e.g., greater than two standard deviations over a three month period) before requesting the driver to investigate a potential tamper.

The utility provider can provide other rules to decide when to issue an investigate flag under the system. For example, a 30% change in a historical usage for a service point within a given zipcode can generate a request for the field worker to investigate the endpoint, while other locations or data (e.g., newly received tamper flag) may prompt the field worker to investigate immediately. The utility provider may only enable the functionality for a few months, such as during the summer when air conditioning is on and electricity usage is high.

Other rules may be established to determine whether a leak has possibly occurred, and to issue an investigate flag to the field worker to find out if indeed a leak exists. Again, the in-field device 108 analyzes data it receives and has stored, as described herein. Further details regarding leak detection may be found in commonly assigned U.S. patent application Ser. No. 10/965,283, entitled "Consumptive Leak Detection System," filed Oct. 14, 2004 (a claiming priority to U.S. Patent Application No. 60/511,834, filed Oct. 16, 2003).

When investigating a tamper or other investigate flag, the in-field device can provide a wizard or series of instructions to the field worker. For example, these instructions can ask the field worker, in a series of screens, to determine whether a meter number stored on the in-field device matches a meter number on the meter itself, whether the meter is upside down, whether an electrical bypass is shown circumventing the meter, whether the seal on the meter is still intact, whether the glass surrounding the meter has been broken, and so forth. The in-field device can also communicate additional information to the field worker, such as warnings of dangerous dogs, directions or a photo indicating the precise location of the meter, requests that pictures be taken (e.g., by way of a Bluetooth camera coupled to the meter), and so forth.

The system can also employ mapping software to automatically generate an optimal route for the field worker to investigate a subset of meters for possible theft/tamper, as noted above. Some of the investigations may simply be false tampers, where a field/service investigation has already been conducted. Thus, the system can coordinate field/service records to eliminate tamper investigation meters if those meters have recently undergone servicing. Other false tamper data could be the result of a recent power outage, maintenance, and so forth. The in-field device 108 may have access to data associated with power outages, maintenance events, and so forth, and thus may not generate an investigation flag to the field worker. (For example, the device may compare the tamper flags of FIG. 5 to a list of service orders, reported outages, etc.) However, if the device does generate such a flag, the worker can investigate to determine whether a tamper has occurred, which would warrant further investigation or enforcement by a trained investigator.

Figure 5:
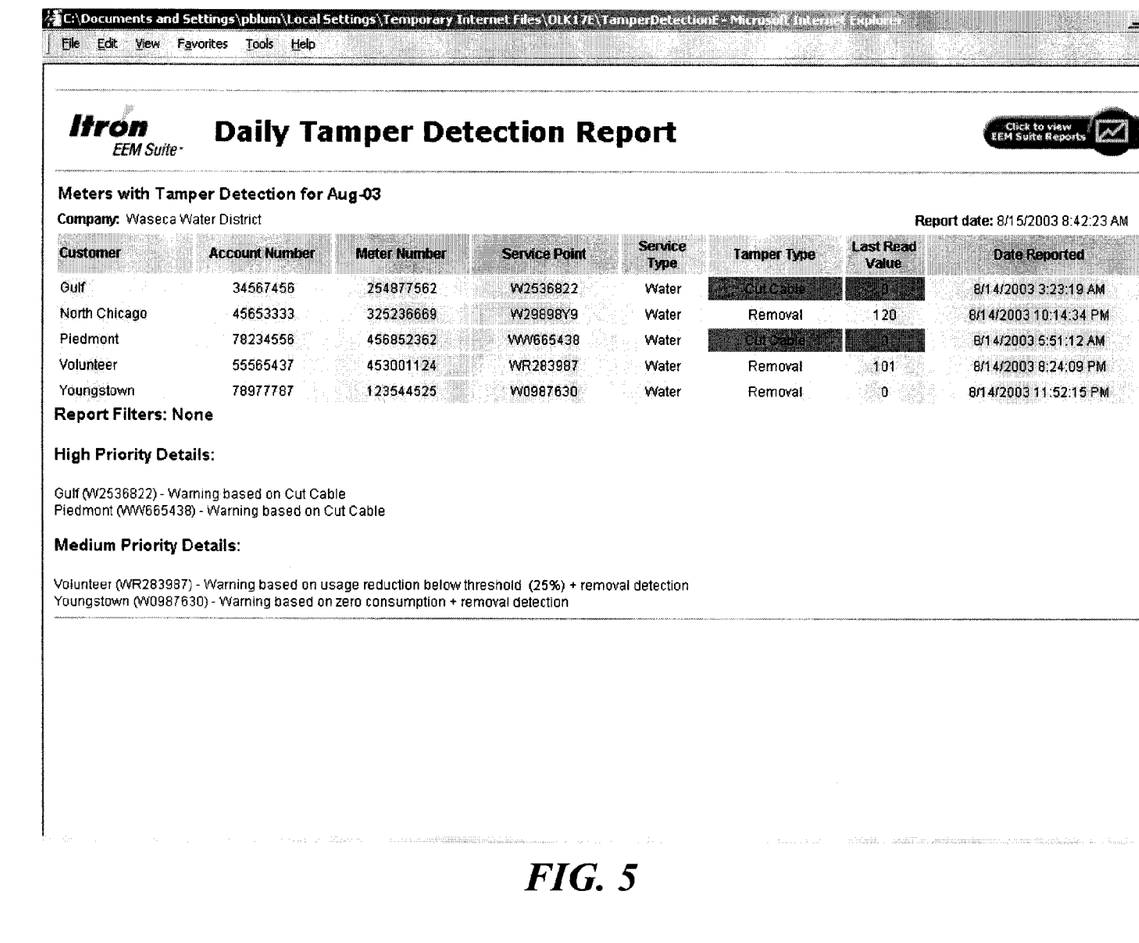
FIG. 5 is a computer display screen depicting a tamper detection report.

The system can automatically generate a work order request and send it electronically to the appropriate servicing department to initiate a service call or investigation. The whole system of FIG. 1 may thus be a closed loop. The system attempts to produce a small list of meters that require investigation by theft/enforcement individuals, so that these specialized individuals do not waste their time with false tampers. FIG. 5 shows an example of a tamper detection report that may be used to generate work order requests for investigators. As shown, the report prioritizes tamper types, where such tamper type may be provided by the field worker during a previous investigation under the in-field device described above.

The in-field device 108 may also analyze data to detect leaks or flag service inspections. Further, certain in-field devices, such readers sold by Itron of Spokane, Wash., can detect a malfunctioning ERT, by providing certain signals to test an ERT to see whether it is malfunctioning. The in-field device may employ or execute many other rules or conditions to identify anomalous or potentially erroneous data, and provide appropriate notifications to the field worker.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the invention can be modified, if necessary, to employ the systems, functions, and concepts of the various references described above to provide yet further embodiments of the invention.

These and other changes can be made to the invention in light of the above Detailed Description. While the above description describes certain embodiments of the invention, and describes the best mode contemplated, no matter how detailed the above appears in text, the invention can be practiced in many ways. Details of the data collection and processing system may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

We claim:

1. A mobile utility data collection apparatus for gathering data regarding consumption of a utility such as electricity, gas or water, wherein the apparatus is for use by an in-field utility data collection worker, the apparatus comprising:
   a wireless transceiver for wirelessly gathering consumption data from multiple utility meters during an in-field utility data collection route;
   a memory for at least partially or temporarily storing the gathered consumption data, and for storing executable instructions;
   at least one processor coupled among the wireless transceiver and the memory, wherein the processor is configured to execute at least some of the executable instructions in the memory, and wherein the processor is configured under the executable instructions to:
      receive internal and external data, wherein the internal data is associated with data gathered by or generated from a utility company, and wherein the external data is associated with data external to the utility company and is associated with a third party data source;
      execute rules based on at least two of the 1) external data, 2) internal data, and 3) gathered consumption data for at least one utility meter to determine whether a possible theft of the utility has occurred during the in-field utility data collection route; and
      if the processor determines that a possible theft of the utility has occurred, then providing one or more instructions to the in-field data collection worker to investigate the at least one utility meter, during the in-field utility data collection route, to gather more information regarding the at least one utility meter or determine whether a theft has occurred.

2. The mobile utility data collection apparatus of claim 1 wherein one of the rules compares external data to the gathered consumption data and another rule compares internal data to the gathered consumption data, wherein the external data includes time/date and the internal data includes historical or forecasted utility consumption data,
   wherein the apparatus is secured or releaseably secured to a vehicle, and
   wherein the processor is configured under the executable instructions to:
      automatically generate a work order ticket to instruct another worker to investigate or repair the at least one utility meter, and
      automatically generate a route of utility meters for the in-field utility data collection worker to investigate, including the at least one utility meter.

3. The mobile utility data collection apparatus of claim 1, further comprising:
   a handheld housing for at least partially receiving the wireless transceiver, memory and processor; and
   a visual display device, and a Global Positioning System (GPS) receiver, both coupled with the processor,
   wherein the processor is configured under the executable instructions to generate a series of instruction screen displays, for display on the visual display device, to provide investigation instructions for the in-field data collection worker.

4. A computer-readable medium whose contents cause at least one movable utility data collection device to perform a method for use during utility data collection, wherein the utility data collection is performed by a meter reading worker, the method comprising:
   receiving utility consumption data from multiple utility meters during utility data collection;
   during the utility data collection, comparing the received utility meter data from at least one utility meter to additional data to determine whether the received meter data is anomalous as compared with the additional data; and
   if the received meter data is potentially anomalous as compared with the additional data, providing one or more meter reading worker instructions, wherein the one or more instructions instruct the meter reading worker to investigate a location associated with the at least one utility meter to gather more information regarding the at least one utility meter while the meter reading worker is performing the utility data collection.

5. The computer-readable medium of claim 4 wherein the computer-readable medium is a memory of the movable utility data collection device or a computer-readable disk.

6. The computer-readable medium of claim 4 wherein the utility meter data includes utility consumption data and at least one tamper flag.

7. An apparatus for use during utility data collection, wherein the utility data collection is performed by a meter reading worker, the apparatus comprising:
   means for receiving utility meter data from multiple utility meters during utility data collection;
   means for comparing the received utility meter data from at least one utility meter to additional data, during the utility data collection, to determine whether to provide additional instructions;
   means for providing one or more meter reading worker instructions if the received meter data indicates a potentially anomalous condition, wherein the one or more instructions instruct the meter reading worker to investigate the at least one utility meter to gather more information regarding the at least one utility meter while the meter reading worker is performing the utility data collection,
wherein the means for means for providing is coupled among the means for comparing and the means for receiving.

8. The apparatus of claim 7 wherein the additional data includes internal and external data, wherein the internal data is associated with data from a utility company.

9. The apparatus of claim 7, further comprising storage means for storing data, and means for capturing an image and storing the captured image in the storage means.

10. The apparatus of claim 7, further comprising display means for displaying data, and means for providing to the display means displayable warnings to the meter reading worker.

11. An automated method for use during manual data collection, wherein the manual data collection is performed by a data collector at multiple, geographically dispersed points, the method comprising:
receiving data associated with multiple data sources during the manual data collection among the multiple, geographically dispersed points;
during the manual data collection, analyzing additional data with respect to the received data from at least one or more of the multiple, geographically dispersed points to determine whether the received data deviates from an expected value based on the additional data;
if the received data is determined to deviate from the expected value, based at least in part on the additional data, providing one or more notifications to be implemented during the manual data collection among the multiple, geographically dispersed points, wherein the one or more notifications instruct the data collector to investigate the at least one or more multiple, geographically dispersed points.

12. The method of claim 11 wherein the additional data is historic or forecast data, and wherein the notifications are associated with a potential tamper associated with the at least one or more multiple, geographically dispersed points.

13. The method of claim 11 wherein the additional data is received from a server computer, and wherein the additional data includes external and internal data, wherein the external data can include weather data, traffic data, time/day data, demographic data, road construction/maintenance data, or news data, and wherein the internal data can include meter readings, metering services, field services, utility construction/maintenance data, joint use data, leak or outage response data, billing investigation data, credit and collections data, or route data.

14. The method of claim 11 wherein at least one of the notifications requests data input from the data collector regarding investigation status with respect to the at least one or more multiple, geographically dispersed points.

15. The method of claim 11, further comprising: determining, based on a threshold, whether to provide the notifications to the data collector, wherein the threshold relates to a type of mobile data collection, a time of year, a percentage change of the received data to a historical value, or approximately one or more standard deviations from an expected value.

16. The method of claim 11 wherein the notifications instruct the data collector to investigate a potential leak or loss with respect to the at least one or more multiple, geographically dispersed points.

17. The method of claim 11 wherein the notifications are one or more wizards visually displayed to the data collector.

18. A data signal readable by an in-field utility data collection system for use during utility data collection, wherein the utility data collection is performed by a meter reading worker, the signal comprising:
providing internal and external data, wherein the internal data is associated with data gathered by or generated from a utility company, and wherein the external data is associated with data external to the utility company, wherein the internal or external data is compared by the in-field data collection system to utility consumption data from multiple utility meters during utility data collection to generate flags representing potential errors or losses with respect to utility data; and
receiving, during or following the utility data collection by the meter reading worker, one or more automated work ticket indicators to investigate or repair at least one of the multiple utility meters.

19. The data signal of claim 18, further comprising wirelessly receiving a request signal during the utility data collection, wherein the request signal requests certain internal or external data.

20. The data signal of claim 18, further comprising wirelessly providing a list, map or route associated with at least some of the multiple utility meters for utility data collection.

21. The data signal of claim 20, further comprising providing instructions or warnings for the meter reading worker during the utility data collection, wherein the instructions or warnings are provided to the meter reading working in response to the flags representing potential errors or losses with respect to utility data.

22. The data signal of claim 20 wherein the one or more work ticket indicators have associated therewith at least one of two priority indicators.

* * * * *